United States Patent [19]

Rumbach

[11] Patent Number: 5,389,034

[45] Date of Patent: Feb. 14, 1995

[54] DEVICE FOR STACKING COINS OR SIMILAR DISK-SHAPED OBJECTS

[75] Inventor: Karl F. Rumbach, Alfter, Germany

[73] Assignee: Standardwerk Eugen Reis GmbH, Bruchsal, Germany

[21] Appl. No.: 95,315

[22] Filed: Jul. 21, 1993

[51] Int. Cl.$^6$ ............................................. G07D 9/06
[52] U.S. Cl. ..................................................... 453/61
[58] Field of Search ..................... 453/31, 59, 61, 62; 53/212

[56] References Cited

U.S. PATENT DOCUMENTS

| | | | |
|---|---|---|---|
| 4,820,237 | 4/1989 | Shinozaki et al. | 453/59 X |
| 5,022,890 | 6/1991 | Rapp | 453/61 X |
| 5,155,978 | 10/1992 | Watanabe | 53/212 X |

Primary Examiner—F. J. Bartuska
Attorney, Agent, or Firm—Baker & Daniels

[57] ABSTRACT

A device for vertically stacking individually, successively fed coins or similar disk shaped objects including at least one coin carrier receiving the coin stack with the coin carrier lowerable within a stacking space. The coin carrier includes a U-shaped finger which horizontally protrudes into the stacking space. A continuously revolving conveyor belt is attached to the coin carrier for stacking of the coins. The stacking space is bounded by up to four movable side parts that are adaptable to the cross section of the coins being stacked.

20 Claims, 2 Drawing Sheets

DEVICE FOR STACKING COINS OR SIMILAR DISK-SHAPED OBJECTS

BACKGROUND OF THE INVENTION

The present invention relates to a device for vertically stacking individually successively fed coins or similar disk-shaped objects.

A device of this type is known from EP 0 332 160 A2 (corresponding to U.S. Pat. No. 5,022,890) and has basically proved itself in view of present stacking philosophy. In the course of time, however, certain design-specific shortcomings have emerged. One of these shortcomings concerns the stacking space is that at high feed velocity, the coins exhibit a flutter that cannot be entirely avoided. As a result, with a canted impinging of the coins on the bounding elements, the coins flip sideways and thus are prevented from forming a satisfactory stack formation.

Another problem concerns the transfer of the coin stack to the pick-up pin for transfer to a follow-on stacking station. In this respect, the concept of the prior stacking device is such that the coin stack is abruptly set on the so-called scissors, by way of which the coin stack is then transferred to the aforementioned pick-up pin.

The specific design of the coin carriers and jointed axles, and specifically the suspension from the attachment to the conveyer belts has also proved to have problems. The suspension connections lose their rigid coordinations in the course of time, so that shortcomings enter into the coin stacking system. Lastly, the guide rail of the feed system has led to problems insofar as it reaches too far toward the stacking space; i.e., at a high feed velocity, the trailing edge of the last fed coin to the stacking space cannot sufficiently quickly flip away from the plane of the guide rail for the next coin to miss it. A final point of difficulty is based on the fact that the coins to be stacked feature tolerance-related different thicknesses, which may lead to inaccurate stacking heights and, thus, variations in the number of coins stacked.

All in all, the prior stacking system has after many years of trial been proved to be worthy of improvement and advancement. The problem underlying the present invention, therefore, is to modify the prior categorical stacking device to the effect that the said problem points will be eliminated. These problems are solved, in terms of the basic configuration, by the features of the present invention.

SUMMARY OF THE INVENTION

The present invention, in one form thereof, includes stacking fingers that approach the stacking space sideways so the coins, as they shoot in from the guide track, are opposed by a stop and that, the stacking finger is passed by the scissors, sideways, for pickup of the finished coin stack. In this way, the coin stack is deposited gently on the scissors.

An advantage of the present invention is that the stacking system is rigidly mounted (i.e., positionally stable) and independent of the changing dimensions of the coins to be stacked.

Another advantage of the present invention is that the stacking system is only functionally, but not mechanically, connected with the changing stacking space. This permits the optimal stacking space possible, since there is no mechanical connection to the movable parts of the stacking device.

A further advantage of the present invention is that it provides the best possible stacking and guidance in the stacking space with an overall simpler and more cost-effective solution as compared to prior coin stacking devices.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
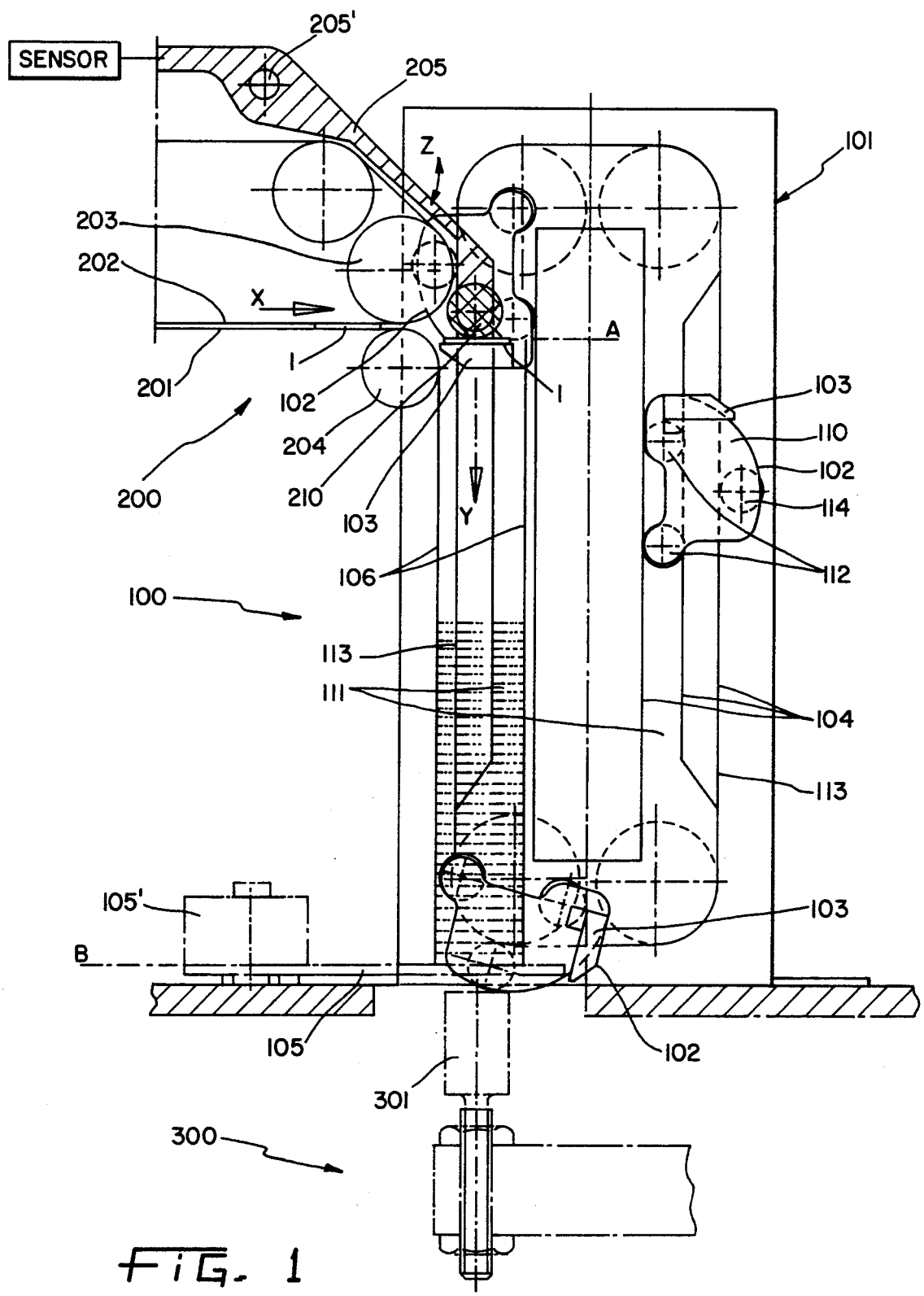
FIG. 1 is a side elevation of the stacking system of the present invention.

FIG. 1 shows a coin stacking system 100 as an intermediate station between a coin feed system 200 which continuously feeds the coins 1, presorted and counted, individually and successively to the stacking unit, and a wrapping station 300 in which a finished coin stack is finally rolled in wrapping paper. From the wrapping station 300, the wrapped coin stack is transferred to a collection container. The coin feed system 200 and the wrapping station 300 are illustrated only insofar as such is required for revealing the function of the coin stacking system 100.

The coins 1 issuing individually, for instance from a coin tray or similar, are in the coin feed system 200 dragged, between a guide rail 201 and a continuous coin conveyer belt 202 (refer to arrow X), toward the coin stacking system 100. The coin conveyer belt 202 reverses at the point of transfer to the coin stacking system 100 via a reversing roll 203.

The specific task of the coin stacking system 100 is to vertically stack coins 1 of the same type, (i.e., the same denomination,) which are supplied quickly in individual succession, and to transfer, upon reaching a certain stack height, (i.e., after stacking a specific reproducible amount of money,) this coin stack as a unit to the wrapping station 300.

The coin stacking system 100 illustrated in FIG. 1 consists of a uniform, compact drive unit 101 for the defined mounting and guidance of at least one coin carrier 102 (three shown in the illustrated embodiment). Based on its function as a bearing, or pick-up, finger for the coins 1, this coin carrier 102 consists of a U-shaped (split) finger 103 (FIGS. 2 and 3) which revolves along an essentially rectangular track 104 corresponding to the illustrated embodiment. Viewed in terms of the time sequence, in the case of the three coin carriers 102 shown in FIG. 1, a U-shaped finger 103 is in a position opposite the guide rail 201 of the coin feed system 200 exactly when a finished coin stack has been surrendered by the leading—viewed in revolving direction Y—coin carrier 102 to the wrapping station 300. The distance between each two revolving coin carriers 102 depends thus on the coin type, i.e., coin thickness to be stacked.

Based on the START position A opposite the coin feed system 200, the coin carriers 102 thus are lowered at a clock (refer to arrow Y, FIG. 1) corresponding to the thickness of the coins 1 to be stacked. Stroke by stroke, a coin 1 is transferred by the coin feed system 200 to the coin stacking system 100 and fed to the coin stack which has already been built up. Once the specified stacking height, (i.e., the specified amount of money,) has been reached, the coin carrier 102, or U-shaped finger 103, is located in its TARGET (or transfer) position B (FIG. 1) and transfers the coin stack to a support 105 which by a drive unit 105' can be spread open and from where, in turn, the coin stack is transferred to a pick-up pin 301 of the wrapping station 300. By way of pick-up pin 301, the coin stack is finally lowered to its wrapping position in the wrapping station 300 and is wrapped.

The device for feeding and stacking coins, and subsequently wrapping the coin stack, as described and paraphrased so far, is known from the initially cited coin stacking device.

The coin stacking device 100 proposed in the framework of the present invention, to begin with, differs from the prior device essentially in that the U-shaped finger 103 of the coin carriers 102 does not oppose the coin feed system 200 as a compact unit, but that actually only the U-shaped finger 103 enters the stacking space 106, whereas the mounting and suspension of the coin carriers 102 are located outside the stacking plane S (FIG. 2) defined by the coin feed system 200 and the axis of the stacking space 106. This makes it possible for the stacking space 106 to be bounded, by the bounding elements 107 (FIG. 2) provided sideways of the stacking plane S, and also by a stop rail 108 (FIG. 2) opposing the coin feed system 200 and extending above the height of the stacking space 106. The center of stacking space 106 and the center of the U-shaped finger 103 are coaxial, based on the coins stacked. The coins 1 fed by the coin feed system 200 at high velocity meet thus with a defined stop situated exactly in feed direction X. To avoid that the trailing coins strike the rear edge of the leading coins, a roll 204, or a bevel, is provided on the end of the guide rail 201, across which roll the rear edge of each coin to be stacked.

With reference to FIG. 1, the mounting and guidance of the coin carriers 102 shall now be illustrated. As already mentioned, the coin carriers 102 with their U-shaped fingers 103 are being moved along a guide plane F (FIG. 2) extending parallel to the stacking plane S, and at that, across a finger carrier 110. A pair of ball bearings 112 installed in a guide groove 111 of the drive unit 101 representing the guide track 104 and via a backing ball bearing 114 running along an outside edge 113 of the guide track 104 causes coil carrier 102 to revolve under definitive mounting. This type of mounting and guidance of finger carrier 110 assures a smooth and positionally stable revolution of the coin carrier 102, so that a coin stack can build up uniformly with three-sided support.

Once the coin stack is built up, (i.e., with the coin carrier 102 lowered at a clock to the underside of the drive unit 101,) the coin stack is gently set on the previously mentioned support 105. This support 105 consists of a pair of straps 115 (FIG. 3) which open in scissor fashion and are so dimensioned that the U-shaped finger 103 can be moved past or through the support 105. The coin stack remains sitting on the straps 115 and, after opening or spreading the straps 115, is finally surrendered to the transfer pin 301 of the wrapping station 300. The transfer height of the pick-up pin 301 and of the U-shaped fingers 103, as well as the guide track, are so adapted to one another that the coin stack will be set down gently.

Figures 2, 3:
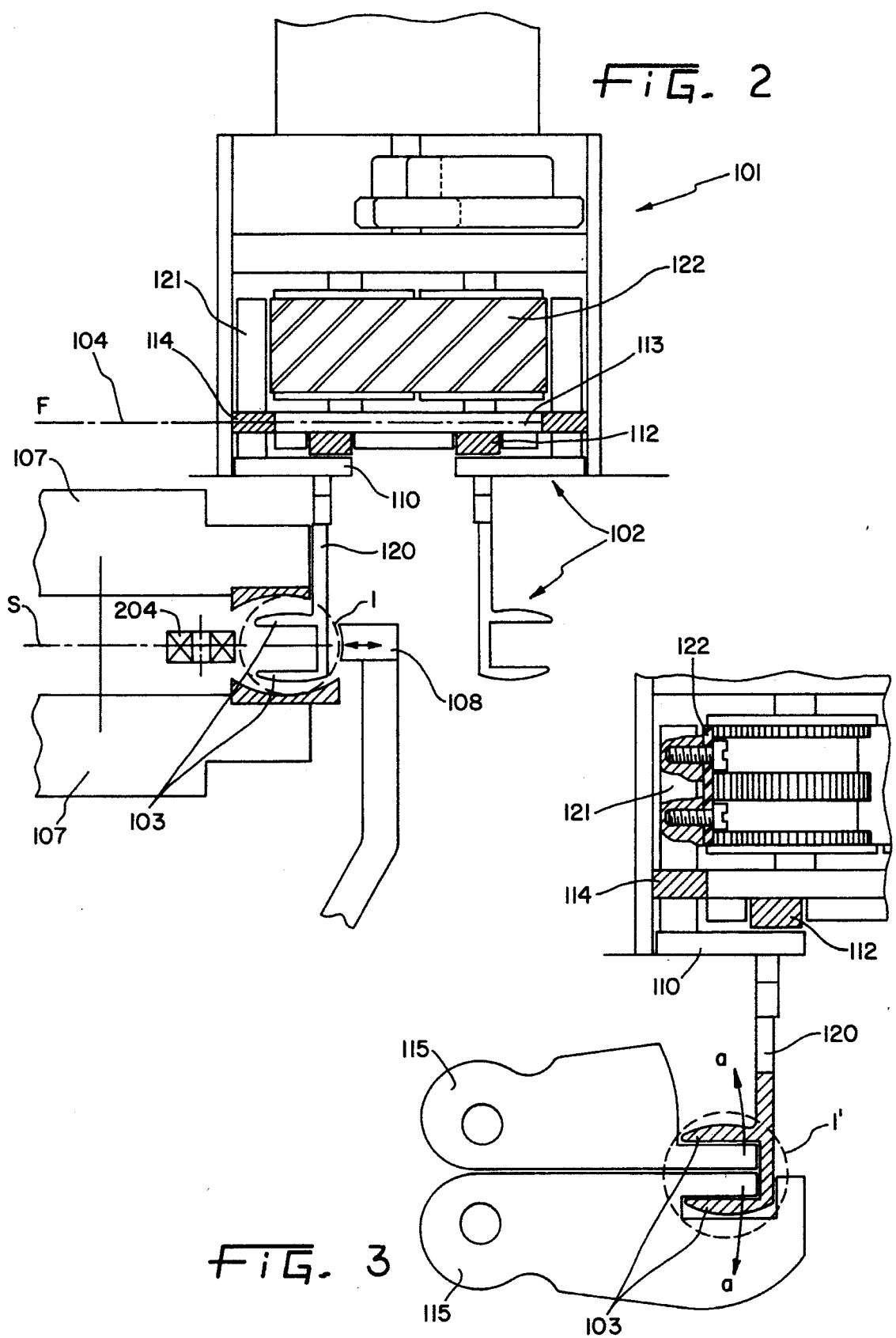
FIG. 2 is a top plan view of the present stacking system.
FIG. 3 is an enlarged sectional view of the coin carrier demonstrating the suspension scissors of the present invention for pickup of a coin stack.

FIG. 2 illustrates specifically the guidance and mounting of the coin carriers 102 and their coordination with the stacking plane S. Additionally illustrated are the contour of the coin carriers 102 and their mounting and guide elements relative to the drive unit 101.

Based on the intended function of the coin stacking system 100, the U-shaped finger 103 of the coin carrier 102 is introduced sideways in the stacking plane S and individually picks up coin after successive coin. Coins notoriously differ not only in thickness (which must be allowed for in conjunction with the stack height of a coin stack and, for instance—refer to FIG. 1—is monitored by a so-called post-clock sensor which is initiated via a pivotably mounted [refer to arrow Z] lever 205 pivoting around 205' and having ball bearing 210), but they also differ in diameter. As illustrated in FIG. 2, this is taken into account insofar as the bounding elements 107 and the stop rail 108 are adjustable in accordance with the coin diameter being stacked. Thus, the stacking space 106 is adjustable to the coins to be processed.

The U-shaped finger 103 is molded to a cantilever type arm 120 which, in turn, is secured to the finger carrier 110. This finger carrier 110 features the ball bearings 112 operating in the guide grooves 111 and is thus operated, perpendicularly to the drawing plane, on a closed revolute, or guide, track 104. Bordering on the finger carrier 110 is a driver plate 121 which, for one, is coupled to the backing ball bearing 114 countering the ball bearings 112 and revolving along the outer contour 113 of the guide track 104. Moreover, the driver plate 121 (referring particularly to FIG. 3) is secured to a continuous conveyer belt 122 which is coupled to the drive unit 101, and drives the coin carriers 102 with their U-shaped fingers 103.

FIG. 2 illustrates the coin stacking system 100 in the plane of the START position A of FIG. 1. FIG. 3 shows the coin stacking system 100 in the plane of the TARGET position B of FIG. 1 in order to show the connection of the coin carrier 102 to the conveyer belt 121 and the function and coordination of the straps 115 forming the support 105. The latter are pivotable (arrow a) relative to each other, and they are opened in scissor fashion when the coin carrier 102 has deposited a coin stack 1' with its U-shaped finger 103.

The coin carrier 102 runs by way of its finger carrier 110 over the ball bearings 112 and is positively moved by the driver plate 121. This driver plate 121 is screwed to the conveyer belt 122 which, in turn, is driven by nonpositive or positive drive means, for instance gears.

For the sake of clarity and completeness, the following is pointed out. A characteristic in view of the present invention is constituted by the fact that the coin carriers and their means of transport, as well as the supporting structure of these elements, are mounted immovably and independently of the size of the coins to be stacked, and that they have no mechanical connection with the stacking space. Concerning this stacking space, it should be noted that it is bounded by up to four movable side parts, with these side parts being adaptable to the cross section of the objects to be stacked. Insofar it is yet to be noted, in supplementation, that the support surface and support shape of the U-shaped finger forming the coin carrier is dimensioned to match the smallest object to be stacked.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for vertically stacking individually successively fed coins from a conveying system into a coin stack in a stacking space, said device comprising:
   at least one coin carrier receiving the coin stack, said coin carrier lowerable within a stacking space and having an axis, said stacking space adaptable to coins of a coin packing machine, in synchronism with the growing stack of coins;
   said coin carrier being formed by a U-shaped finger which horizontally protrudes into the stacking space, and being secured to a continuously revolving means of transport having drive gears which move the coin carriers along a specific and substantially rectangular guide track in such a way that the means of transport in stacking the coins are, along with the coin carriers, lowered in positionally stable fashion in the stacking space, the plane of said guide track offset sideways relative to the stacking plane formed by the conveying system and the axis of the stacking space, said coin carrier protruding sideways into the stacking space in such a way that the center of the stacking space is situated on the center line of the successively fed coins and is also the center of said U-shaped finger forming the coin carrier, said coin carrier aligned sideways in the direction of the axes of said drive gears of said transport means to protrude beyond the width of said drive gears;
   a support structure supporting said coin carrier and said transport means, said coin carrier, said transport means and said support structure mounted together immovably and independently of the size of the coins to be stacked and having an absence of a mechanical connection with the stacking space; and
   said stacking space bounded by up to four movable side parts which are adaptable in shape to the cross section of the coin to be stacked.

2. The device of claim 1 in which said U-shaped finger forming the coin support is adapted to the support surface and shape of the smallest coin.

3. The device of claim 1 in which said transport means is a single endless cogged belt.

4. The device of claim 1 in which at least two of said side parts of the stacking space are adapted to the shape of the objects to be stacked, to a degree such that an optimum guidance of the stack in its downward motion without lateral canting or shifting is formed; and
   further including a stop rail bounding the stacking space and opposing the direction of coin feed.

5. The device of claim 1 further comprising a coin stack pick-up pin located at the transition to a follow-on wrapping station, the U-shaped finger and the transfer height of the pick-up pin are adapted to each other and dimensioned that the transfer height exactly matches the transition of the U-shaped finger from the horizontal stacking direction to the guide track reversal.

6. The device of claim 5, characterized in that the pick-up pin is so designed that the U-shaped finger is allowed to pass by on both sides.

7. The device of claim 1 further including a hold-down element which is always on top of the top coin of the coin stack, said hold-down element is coupled to a post-clock sensor responding to thickness variations of the coins.

8. The device of claim 7, in which said hold-down element is a pivotably mounted ball bearing which is dimensioned to plunge into the guide track that the U-shaped finger sweeps past.

9. The device of claim 1, in which said transport means includes several coin carriers, said means having the smallest distance between said coin carriers being adapted to the greatest stacking height of the coins to be processed.

10. The device of claim 2 in which said transport means is a conveyor chain.

11. The device of claim 2 in which at least two of said side parts of the stacking space are adapted to the shape of the objects to be stacked, to a degree such that an optimum guidance of the stack in its downward motion without lateral canting or shifting is formed; and
   further including a stop rail bounding the stacking space and opposing the direction of coin feed.

12. The device of claim 2 further comprising a coin stack pick-up pin located at the transition to a follow-on wrapping station, the U-shaped finger and the transfer height of the pick-up pin are adapted to each other and dimensioned that the transfer height exactly matches the transition of the U-shaped finger from the horizontal stacking direction to the guide track reversal.

13. The device of claim 2 further including a hold-down element which is always on top of the top coin of the coin stack, said hold-down element is coupled to a post-clock sensor responding to thickness variations of the coins.

14. The device of claim 2, in which said transport means includes several coin carriers, said means having the smallest distance between said coin carriers being adapted to the greatest stacking height of the coins to be processed.

15. The device of claim 3 in which at least two of said side parts of the stacking space are adapted to the shape of the objects to be stacked, to a degree such that an optimum guidance of the stack in its downward motion without lateral canting or shifting is formed; and
   further including a stop rail bounding the stacking space and opposing the direction of coin feed.

16. The device of claim 3 further comprising a coin stack pick-up pin located at the transition to a follow-on wrapping station, the U-shaped finger and the transfer height of the pick-up pin are adapted to each other and dimensioned that the transfer height exactly matches the transition of the U-shaped finger from the horizontal stacking direction to the guide track reversal.

17. The device of claim 16, characterized in that the pick-up pin is so designed that the U-shaped finger is allowed to pass by on both sides.

18. The device of claim 5 further including a hold-down element which is always on top of the top coin of the coin stack, said hold-down element coupled to a post-clock sensor responding to thickness variations of the coins.

19. The device of claim 5 in which said transport means includes several coin carriers, said means having the smallest distance between said coin carriers being adapted to the greatest stacking height of the coins to be processed.

20. A device for vertically stacking individually successively fed coins or similar disk-shaped objects in a stacking space, said device comprising:

at least one coin carrier receiving the coin stack, which coin carrier is lowerable within a stacking space, the latter adaptable to the coins, of a coin packing machine, in synchronism with the growing stack, the coin carrier being formed by a U-shaped finger which horizontally protrudes into the stacking space, and being secured to a continuously revolving means of transport which moves the coin carriers along a specific, substantially rectangular guide track in such a way that the means of transport, in stacking the coins, are along with the coin carriers lowered in positionally stable fashion in the stacking space, wherein the plane of the guide track is sideways offset relative to the stacking plane formed by the conveying system and the axis of the stacking space, said coin carriers are sideways aligned in the direction of the axes of the drive gears of the transport means and protrude beyond its width, said coin carrier, the means of transport and the support structure of these elements are mounted immovably and independently of the size of the coins to be stacked and have an absence of a mechanical connection with the stacking space, said coin carrier protrude sideways into the stacking space in such a way that the center of the stacking space is situated on the center line of the coin feed and is also the center of the U-shaped finger forming the coin carrier; and wherein said stacking space is bounded by up to four movable side parts which in their shape are adaptable to the cross section of the object to be stacked.

* * * * *